(12) United States Patent
Silver et al.

(10) Patent No.: US 8,002,403 B2
(45) Date of Patent: Aug. 23, 2011

(54) VARIABLE FOCUS LENS AND SPECTACLES

(76) Inventors: Joshua David Silver, Oxford (GB); Andrew Robertson, Oxford (GB); Miranda Newbery, Oxford (GB)

( * ) Notice: Subject to any disclaimer, the term of this patent is extended or adjusted under 35 U.S.C. 154(b) by 19 days.

(21) Appl. No.: 12/373,260

(22) PCT Filed: Jul. 10, 2007

(86) PCT No.: PCT/GB2007/002576
§ 371 (c)(1),
(2), (4) Date: Nov. 6, 2009

(87) PCT Pub. No.: WO2008/007077
PCT Pub. Date: Jan. 17, 2008

(65) Prior Publication Data
US 2010/0053543 A1 Mar. 4, 2010

(30) Foreign Application Priority Data

Jul. 10, 2006 (GB) .................................. 0613688.1

(51) Int. Cl.
*G02C 1/02* (2006.01)
*G02C 7/06* (2006.01)
*G02B 3/12* (2006.01)

(52) U.S. Cl. ......... 351/110; 351/153; 351/169; 359/666

(58) Field of Classification Search .................... 351/41, 351/51, 110, 153, 159, 168–172, 176; 359/665, 359/666, 676
See application file for complete search history.

(56) References Cited

U.S. PATENT DOCUMENTS 3,598,479 A * 8/1971 Wright .......................... 351/159
5,684,637 A * 11/1997 Floyd .............................. 359/666
7,768,712 B2 * 8/2010 Silver et al. .................... 359/666

FOREIGN PATENT DOCUMENTS
WO 01/75510 A1 10/2001
WO 02/063353 A2 8/2002

* cited by examiner

*Primary Examiner* — Huy K Mai
(74) *Attorney, Agent, or Firm* — Sughrue Mion, PLLC

(57) ABSTRACT

A variable focus lens includes a ring with a front surface and a rear surface. A flexible membrane is held between the front surface of the ring and a generally rigid transparent front cover, and a rear cover is attached to the rear surface of the ring, optionally with a second flexible membrane sandwiched between the rear cover and the ring. A cavity is formed between the flexible membrane and the rear cover or the second flexible membrane is filled with a liquid, and the amount of fluid in the cavity can be varied to vary the curvature of the flexible membrane and so vary the optical characteristics of the lens. The ring of the lens may be coloured, and may be transparent, translucent or opaque. Alternatively, a decorative cover may be attached to the front of the ring to give the appearance of a frame. The lenses may be used in variable focus spectacles.

18 Claims, 4 Drawing Sheets

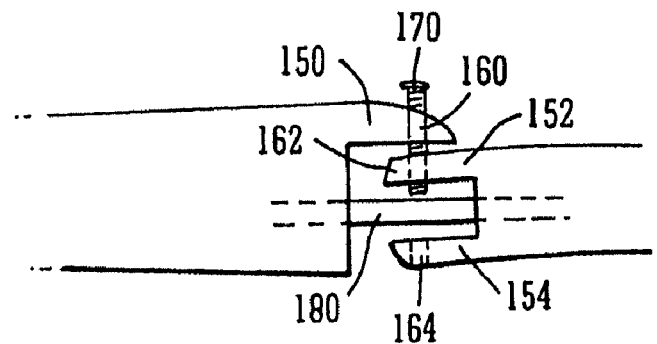
FIG. 6
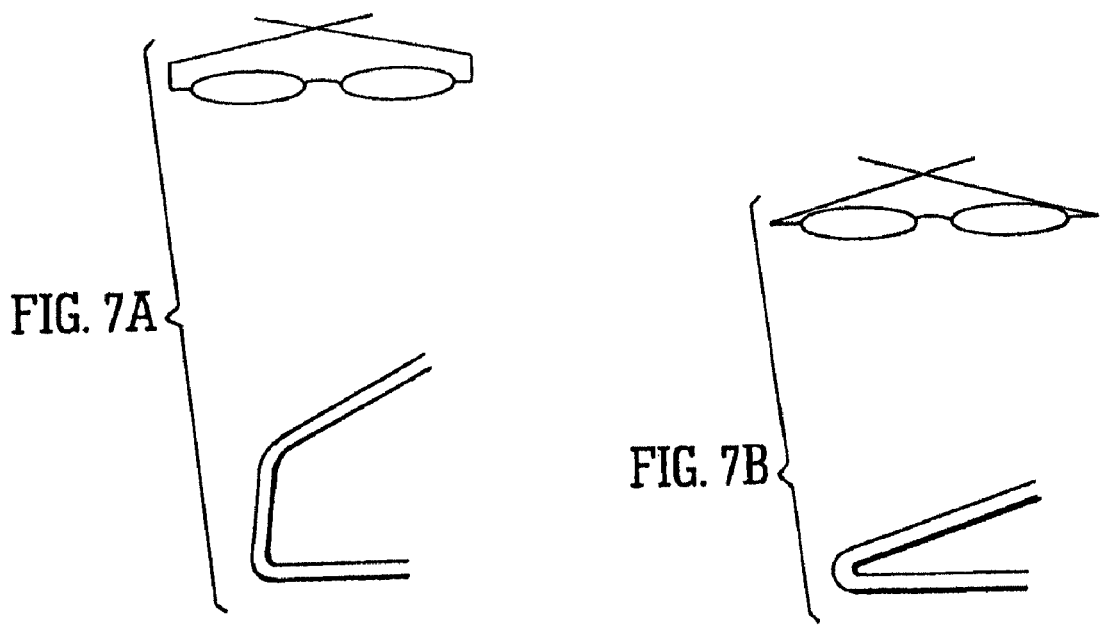
FIG. 7A
FIG. 7B

VARIABLE FOCUS LENS AND SPECTACLES

CROSS REFERENCE TO RELATED APPLICATION

This application is a National Stage of International Application No. PCT/GB2007/002576 filed Jul. 10, 2007, claiming priority based on Great Britain Patent Application No. 0613688.1, filed Jul. 10, 2006, the contents of all of which are incorporated herein by reference in their entirety.

BACKGROUND

The invention relates to a variable focus lens, and to spectacles using the variable focus lens. It also extends to certain types of spectacles using other variable focus lenses.

One type of prior art variable focus lens is disclosed, for example, in GB 2333858. This lens is formed from several interengaging rings. Flexible transparent membranes are trapped between the rings, and the rings are formed such that as they interengage, they tension the flexible membranes (which improves the performance of the lens). One of the rings is then deformed to hold the assembly together. However, this design places certain requirements (such as-ductility) on the materials used to form the rings, and also requires strict tolerances in the manufacturing of the rings. Further, each lens is formed from a large number of separate parts, which complicates manufacture.

SUMMARY

According to the invention, there is provided a variable focus lens, comprising a ring with a front surface and a rear surface, a flexible membrane held between the front surface of the ring and a generally rigid transparent front cover, and a rear cover attached to the rear surface of the ring, wherein a cavity is formed between the flexible membrane and the rear cover, the cavity being filled with a liquid, and wherein the amount of fluid in the cavity can be varied to vary the curvature of the flexible membrane and so vary the optical characteristics of the lens.

Such a construction does not require any special characteristics from the parts forming the lens (other than transparency of the front and rear covers and flexibility and transparency of the membrane). It is also simple to construct.

In a preferred form, the ring and the front cover are attached to the membrane using adhesive. This further simplifies manufacture.

In a preferred form, a passage is provided through the wall of the ring to allow liquid to be introduced into and removed from the cavity, to vary the focus of the lens. A second passage (a fill hole) can be used to fill the lens, and can be closed with a stopper after the lens is filled.

One or both of the front cover and the rear cover may be lenses themselves. This allows the variable focus lens to have a greater power (or a different range of powers) than could be achieved solely by deforming the flexible membrane.

In an alternative form, the lens comprises two membranes, one attached to each side of the ring, with a front cover attached to the front of the ring to cover the front membrane, and a rear cover attached to the rear of the ring to cover the rear membrane. Again, one or both of the front cover and the rear cover may be lenses.

In a preferred form, the ring is coloured; it may be transparent, translucent or opaque. The ring will then differ in appearance from the rest of the lens, and will appear to be a frame for the lens. A decorative cover may also be attached to the front of the ring to give the appearance of a frame.

The lens may form part of a pair of spectacles. The spectacles consist of two such lenses, joined by a nosepiece, with each lens having a hinged armpiece attached thereto. If the rings of the lenses are coloured, then this will give the appearance of a frame, although the spectacles will in effect be frameless.

In a preferred form, the nosepiece fits on a projection on the ring, and in a particularly preferred, form, this projection is a stopper for closing the fill hole.

As the distance between the lenses is determined by the width of the nosepiece, this provides a simple way of varying the interpupillary distance of the spectacles. A wider nosepiece will increase the interpupillary distance, and a narrower nosepiece will reduce it.

In an alternative form, the rings of the two lenses of a pair of spectacles may be formed as a single piece, with an integral nosepiece joining them. This single frame piece may be coloured to give the appearance of a frame as described above. Front and back covers and a flexible membranes may be attached as described above.

The means for adjusting the power of the lenses are preferably positioned in the armpieces of the spectacles. In a preferred form, these means take the form of reservoirs connected to the cavities of the lenses (with one reservoir serving to adjust each cavity). The volume of the reservoir can be increased or decreased, to force liquid into or remove liquid from the cavity. The volume of the reservoir can be used to control the available power range of the lens.

Various types of reservoir which can be used in this way are disclosed in WO 99/47958. A particularly preferred form of reservoir is in the form of a cylinder, whose axis is disposed along the length of the armpiece. A piston in the cylinder is forced to move by rotation of a knob attached to the cylinder (and a rack-and-pinion mechanism may be used in this regard). Preferably, the cylinder is disposed within the armpiece, and the knob is positioned on the side of the armpiece away from the user's head, to allow easy access.

A tube extends from the outlet of the reservoir to one of the passages through the ring of the lens. Preferably, this tube is flexible, and passes through the hinge of the armpiece, to improve the appearance of the spectacles. This also provides some protection for the tube.

In order to prevent the flexible tube from being subjected to excessive bending when the armpieces are folded around the hinges, it is preferred for the hinges to be disposed a short distance behind the plane of the lenses (ie offset towards a wearer's head). This ensures that the maximum curve through which the flexible tube has to bend is around 90 degrees.

Of course, the spectacles can use other types of variable focus lenses.

BRIEF DESCRIPTION OF THE DRAWINGS

Preferred embodiments of the invention will now be described by way of example only and with reference to the accompanying drawings, in which:

FIG. 6 is a detailed view of the hinge of the spectacles; and

FIGS. 7a and 7b are comparative views explaining the placement of the hinge of the spectacles.

DETAILED DESCRIPTION

Figure 1:
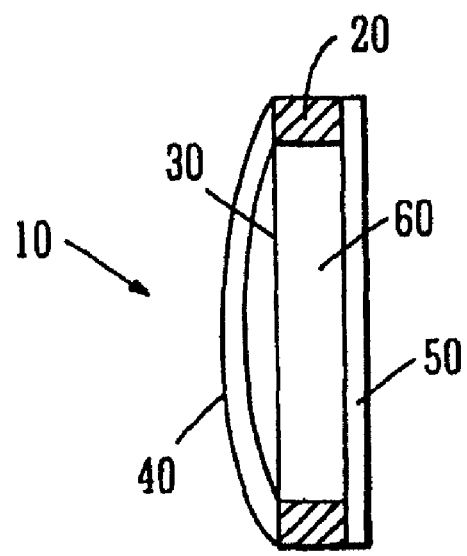
FIG. 1 is a cross-sectional view of a first embodiment of a variable focus lens.

As best shown in FIG. 1, the lens 10 is formed from four main parts: a ring 20 (shown in more detail in FIG. 3), a flexible membrane 30, a front cover 40 and a rear cover 50.

The flexible membrane 30 is attached to the front of the ring 20, and the rear cover 50 is attached to the rear of the ring 20. Between them, the ring 20, the flexible membrane 30 and the rear cover 50 define a cavity 60. In use, this cavity 60 is filled with a liquid, and the amount of liquid in the cavity can be varied to change the volume of the cavity. The ring 20 and the rear cover 50 are generally rigid, and so changing the volume of the cavity 60 deforms the flexible membrane 30 and thus varies the optical characteristics of the lens.

The front cover 40 is attached to the membrane 30, so that the membrane 30 is sandwiched between the ring 20 and the front cover 40. As shown in the drawings, the inner surface of the front cover 40 (the surface facing the flexible membrane 30) is curved. This provides sufficient space for the flexible membrane 30 to be deformed, and thus allows the power of the lens to be adjusted.

The front cover 40 may be formed with a vent hole (not shown) to allow air to escape from the gap between the front cover 40 and the flexible membrane 30 as the membrane moves. However, this vent hole may allow water to enter into the gap, and so may not be desirable under certain circumstances.

Figure 3:
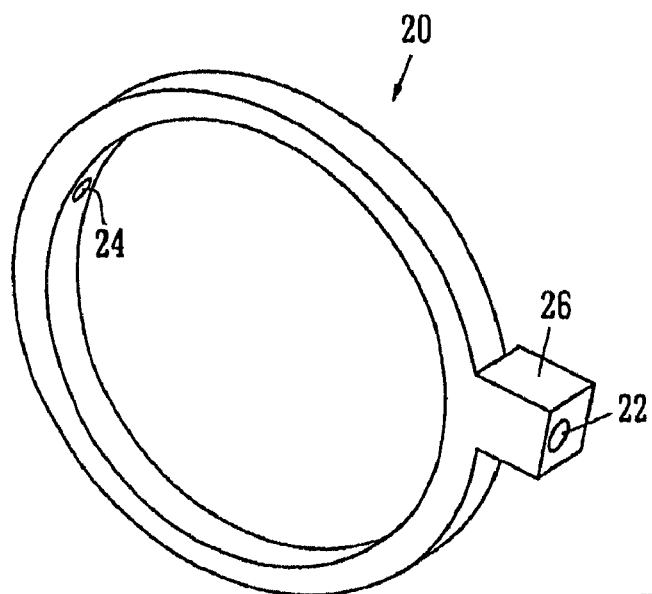
FIG. 3 is a perspective view of a ring for use in such a lens.

The ring 20 is shown in more detail in FIG. 3. The version in FIG. 3 is generally circular, but any appropriate shape can be used. As can be seen, there are two passages 22, 24 through the wall of the ring. In use, one of these passages 22 is in communication with a flexible tube connected to a variable-volume liquid reservoir (described in more detail later); as the volume of the reservoir is varied, the amount of liquid in the cavity is also varied to vary the power of the lens. As shown in FIG. 3, this passage can extend through a boss 26 projecting from the ring, to which boss 26 an armpiece holding the reservoir can be attached. The other passage 24 (a fill hole) is used to fill the cavity and the reservoir after assembly.

Figure 2:
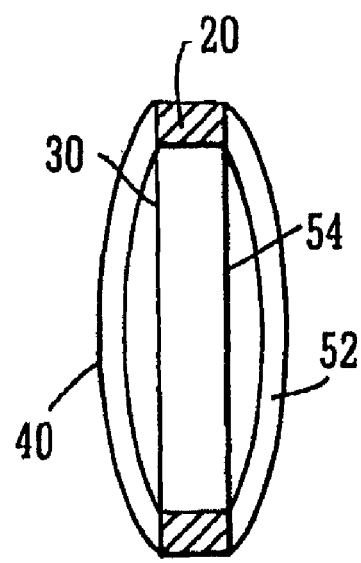
FIG. 2 is a cross-sectional view of a second embodiment of a variable focus lens.

A second version of the lens is shown in FIG. 2. This version is similar to that shown in FIG. 1, except that it includes a second flexible membrane 54, sandwiched between the ring 20 and the rear cover 52. The inner faces of both the front and rear covers 40, 52 are curved to provide sufficient space for the membranes 30, 54 to deform.

In both lenses, the front cover 40, the rear cover 50, 52 and the flexible membrane(s) 30, 54 are all transparent. However, as the ring 20 is not positioned in the wearer's optical path, there is no need for it to be transparent, and indeed, it can be of any appearance. If the ring is opaque, then it will appear as a frame around the lens.

Further, as the ring does not play any part in the focussing procedure, it does not need to be formed to optical quality, and so the mould used to form the ring can be made more cheaply.

Figure 4:
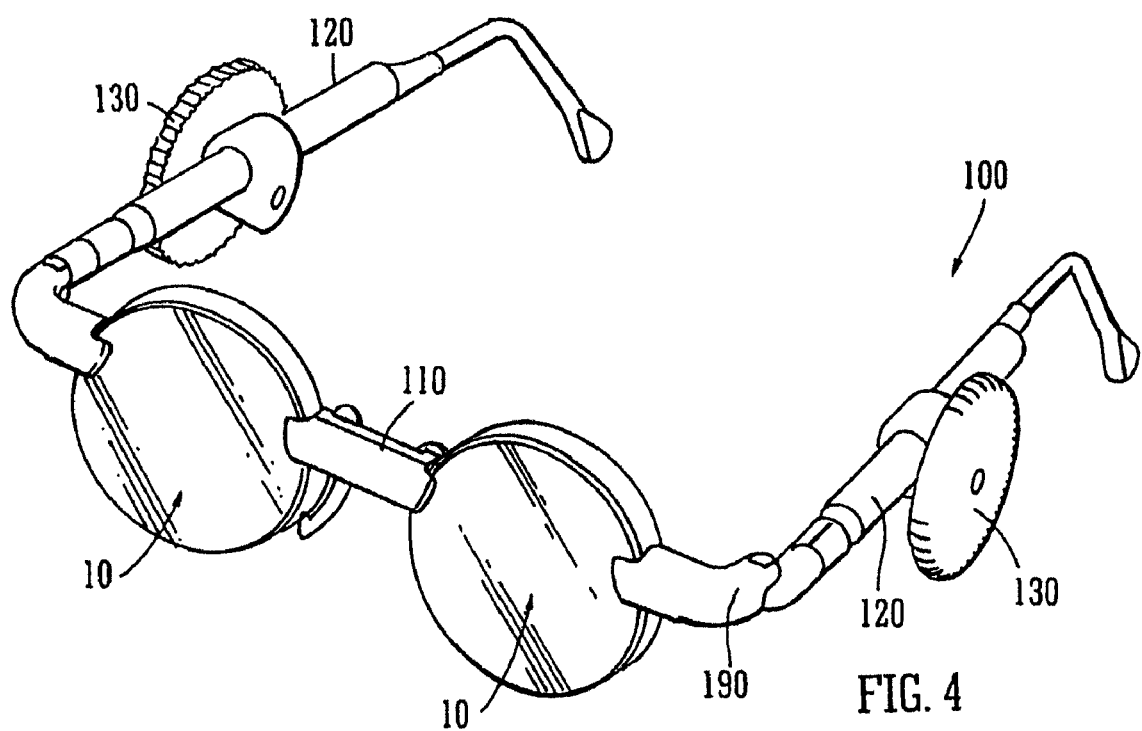
FIG. 4 is a perspective view of a pair of spectacles using two such lenses.
Figure 5:
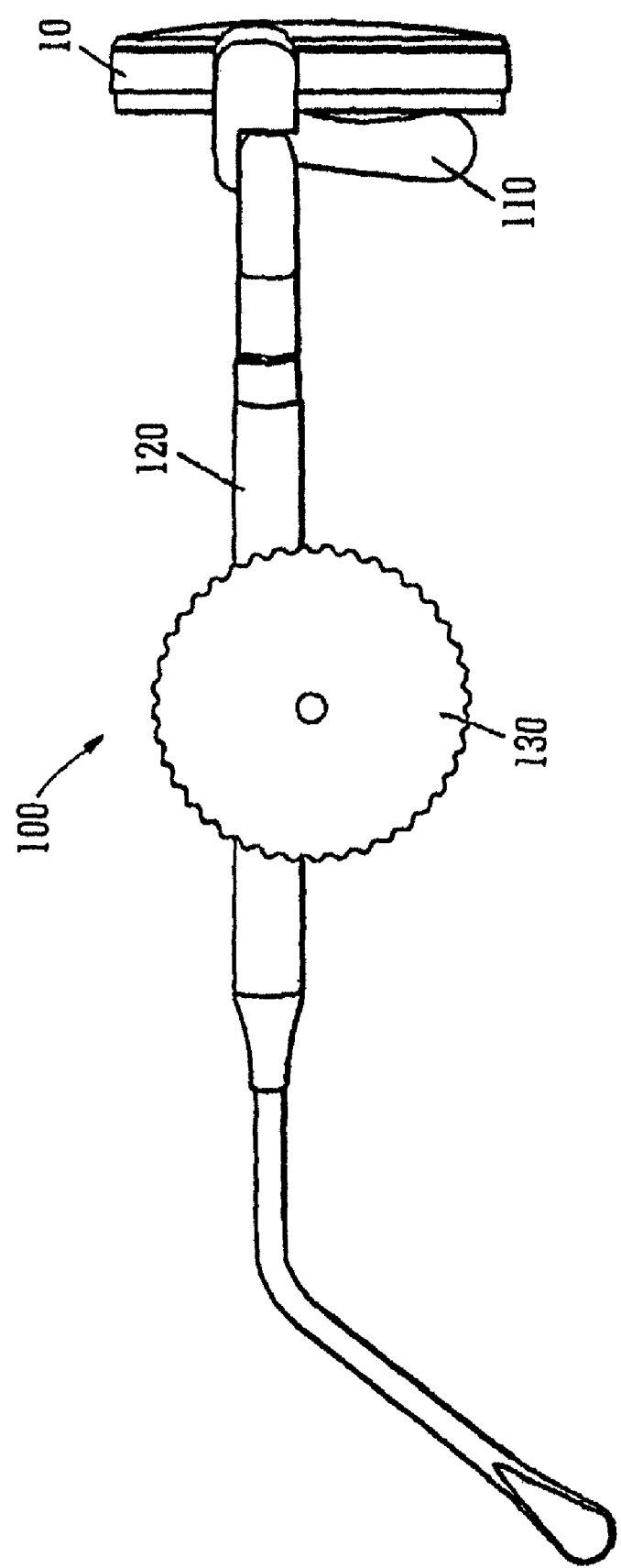
FIG. 5 is a side view of the spectacles of FIG. 4.

A pair of adjustable spectacles 100 using the lenses described above are shown in FIGS. 4 and 5. The spectacles comprise two lenses 10 connected by a nosepiece 110. Attached to each lens 10 is an armpiece 120. The ring 20 of FIG. 3 is used to form the lens on the right in FIG. 4, and the armpiece is attached to the boss 26. Obviously, the ring used to form the lens on the left in FIG. 4 is a mirror image of that in FIG. 3.

Each armpiece 120 includes a variable-volume liquid reservoir, which is in communication with the cavity of the respective lens. The reservoir is in the form of a cylinder with a movable piston, and movement of the piston either forces liquid from the reservoir into the cavity, or pulls liquid from the cavity into the reservoir, to vary the volume of the cavity and so change the shape of the flexible membrane.

On each armpiece there is provided a wheel 130, on the side of the arm facing away from the wearer's head. This wheel can be turned by the wearer while the spectacles 100 are being worn. Rotation of the wheel causes the reservoir piston to move (possibly through a rack-and-pinion mechanism) to vary the volume of liquid in the cavity, and thus vary the focus of the lens. Each lens can be adjusted individually, and as the reservoirs remain attached to the lenses, further adjustment can be carried-out at any time (for example, to accommodate deterioration in the wearer's eyesight).

The armpieces are formed from two hingedly-connected parts. The shorter of these (190) is connected to the boss on the ring, to connect the armpiece to the lens. The longer piece holds the reservoir, and has a standard temple piece.

The flexible tube, which connects the reservoir to the lens, passes through the hinge. A close-up view of the hinge is shown in FIG. 6. As can be seen, the shorter part of the armpiece is provided with a projection 150, through which an opening 160 is formed. The longer part of the armpiece has two projections 152, 154, which also have openings 162, 164 formed therethrough. A screw 170 passes through the opening 160 in the projection 150 on the shorter part and the opening 162 in one of the projections 152 on the longer part, to hold the parts together.

In an alternative arrangement, the screw 170 may be inserted through the holes 162, 160 from below. A screwdriver can access the screw 170 through the lower hole 164. Where the materials permit, a self-tapping screw may be used. Alternatively a nut and bolt may be used to secure the two armpiece portions together.

The flexible tube 180 passes through bores in the longer part and the shorter part, to protect it. Alternatively, cover pieces may be provided at the outside of the hinge to protect the tube 180 from damage.

In an alternative form, the shorter part can also be formed with two projections, and two screws can be used to connect each projection of the shorter part with a corresponding projection on the longer part.

FIGS. 7a and 7b are schematic views explaining the positioning of the hinge. FIG. 7b shows the situation where the hinge is positioned in generally the same plane as the lenses, and as can be seen, the flexible tube is bent almost double when the spectacles are folded. This could lead to kinking of the tube, and possibly damage it.

FIG. 7a shows a preferred position of the hinge. Here, the hinge is offset backwards from the plane of the lenses (from a wearer's point of view). As can be seen, the sharpest bend which the flexible tube is subjected to here is around 90 degrees, which reduces the chance of damage.

A method of manufacture of the lenses and the spectacles will now be described by way of example only.

Firstly, each lens is formed. As a first step, the rear cover (which may be a standard ophthalmic quality lens) is bonded to the ring. This can be done by applying a thin bead of UV adhesive (such as Loctite 3311) to the spacer, attaching the rear cover, and then curing.

A disk of mylar (which may be Type DL1) is then pre-tensioned using a tensioning rig. A thin bead of UV adhesive is applied to the front of the ring, and the assembly of the ring and the rear cover is then placed on the surface of the mylar, which can been pre-treated for adhesion. This assembly is then cured.

The assembly is cut from the tensioning rig, and the mylar is trimmed back to the edge of the lens assembly.

The front cover (which may also be a standard ophthalmic quality lens) is then bonded to the rear assembly by applying a thin bead of UV adhesive to the front lens. As shown in FIG. 1, the front cover is curved and the edge of the cover can be prepared for bonding by machining (e.g. sanding) to provide an adequate plane surface to bond with the lens assembly. The UV adhesive is then cured to produce a completed lens.

The hinge assemblies are then prepared. The two parts of the hinge assembly are located in their correct position, and are secured in place with a hinge screw and nut. Threadlock adhesive can be used if necessary. The opening in the lower projection of the longer part (as shown in FIG. 6) provides easy access for a screwdriver to tighten the fixing screw. The flexible tube is then threaded through the assembled hinge. At this stage using an excess length of feed tubing simplifies the assembly process and the excess length can be trimmed back later.

One end of the flexible tube is then bonded into the boss of the ring, by applying UV adhesive to the external surface of the tube then curing.

The armpiece is then prepared. Firstly, the piston of the reservoir is assembled by securing a head (which carries an "O" ring seal) to a tail (which is formed by a rack element) using a screw. In an alternative construction, the piston could be a one piece component. The piston is inserted into a tube (which forms a near end of the cylinder).

A pinion housing is joined to the back of the tube, and a further section of tube is joined to the back of the pinion housing. These parts are aligned and then joined with adhesive to form the cylinder. Alternatively, a single tube element can be modified for use with the pinion housing.

The rear of the cylinder is then plugged. The plug is arranged to provide an external connection for a standard spectacle temple piece which is then attached. (Connection of the temple pieces to the glasses can alternatively be part of the final spectacle assembly).

The wheel, which has an integrated pinion, is inserted into the pinion housing to engage with the rack, and locks in place. The wheel can be secured by bonding a small locking tube section to the wheel shaft section protruding beyond the pinion housing.

The flexible tube is then trimmed to the appropriate length, and its free end is bonded to the cylinder. The cover pieces are attached to protect the tube and stiffen the completed assembly.

The assembly's fluid system (lens, flexible tube and cylinder) are then filled with silicone oil (Dow Corning Type 704 or equivalent).

A syringe with an outside diameter smaller than the internal diameter of the fill hole is used, so that air can vent around the needle as the silicone fluid fills the system. In one currently preferred method, the assembly is set to maximum lens power (with the piston pushed fully in). The assembly is then positioned with the fill hole pointing vertically upwards, the syringe is inserted, and the assembly is filled to 50% full. The assembly is then set to minimum lens power (with the piston pulled out), then back to maximum power. This process removes air from the assembly, and can be repeated if necessary. The remaining volume of the lens is then filled with oil to overflowing.

The excess silicone oil is wiped away, and a stopper is inserted into the fill hole. In a currently preferred form, the stopper is a polycarbonate rod which is an interference fit with the fill hole. The stopper is secured permanently by applying UV adhesive at its joint with the lens assembly and curing.

The stopper may be installed overlength for ease of assembly, and then trimmed back to provide an external protrusion projecting from the lens. This protrusion is used in locating the nosepiece during final spectacle assembly.

The above steps are then repeated for the second lens and armpiece. The spectacles are then assembled by joining the left- and right-handed assemblies to the sides of the nosepiece. Nosepieces of differing widths can be used, to provide spectacles of differing interpupillary distances.

Of course, the spectacles could be made using a different type of variable focus lens.

The invention claimed is:

1. A variable focus lens, comprising a ring with a front surface and a rear surface, a flexible membrane held between the front surface of the ring and a generally rigid transparent front cover, and a rear cover attached to the rear surface of the ring, wherein a cavity is formed between the flexible membrane and the rear cover, the cavity being filled with a liquid, and wherein the amount of fluid in the cavity can be varied to vary the curvature of the flexible membrane and so vary the optical characteristics of the lens.

2. A variable, focus lens as claimed in claim 1, wherein the ring and the front cover are attached to the membrane using adhesive.

3. A variable focus lens as claimed in claim 1, wherein a passage is provided through the wall of the ring to allow liquid to be introduced into and removed from the cavity, to vary the focus of the lens.

4. A variable focus lens as claimed in claim 3, wherein a second passage is provided through the wall of the ring, and is used to fill the lens and is closed with a stopper after the lens is filled.

5. A variable focus lens as claimed in claim 1, wherein one or both of the front cover and the rear cover is itself a lens.

6. A variable focus lens as claimed in claim 1, wherein the ring is coloured.

7. A variable focus lens as claimed in claim 6, wherein the ring is transparent, translucent or opaque.

8. A variable focus lens as claimed in claim 1, wherein a decorative cover is attached to the front of the ring to give the appearance of a frame.

9. A pair of spectacles, comprising two lenses as claimed in claim 1, joined by a nosepiece, with each lens having a hinged armpiece attached thereto.

10. A pair of spectacles as claimed in claim 9, wherein the nosepiece fits on a projection on the ring of each lens.

11. A pair of spectacles as claimed in claim 10, wherein, for each lens, a passage is provided through the wall of the ring to allow liquid to be introduced into and removed from the cavity, to vary the focus of the lens, and a second passage is provided through the wall of the ring, and is used to fill the lens and is closed with a stopper after the lens is filled; and
wherein the projection is a stopper for closing the second passage.

12. A pair of spectacles as claimed in claim 9, wherein the rings of the two lenses of a pair of spectacles are formed as a single piece, with an integral nosepiece joining them.

13. A pair of spectacles as claimed in claim 10, wherein the means for adjusting power of the lenses is positioned in the armpieces of the spectacles.

14. A pair of spectacles as claimed in claim 13, wherein the means for adjusting the power of the lenses take the form of reservoirs connected to the cavities of the lenses (with one reservoir serving to adjust each cavity), wherein the volume of each reservoir can be increased or decreased, to force liquid into or remove liquid from the cavity.

15. A pair of spectacles as claimed in claim 14, wherein a tube extends from the outlet of the reservoir to one of the passages through the ring of the lens.

16. A pair of spectacles as claimed in claim 15, wherein the tube is flexible, and passes through the hinge of the armpiece.

17. A pair of spectacles as claimed in claim 15, wherein the hinge of the armpiece is disposed a short distance behind the plane of the lenses.

18. A variable focus lens, comprising a ring with a front surface and a rear surface, a flexible membrane held between the front surface of the ring and a generally rigid transparent front cover, and a second flexible membrane held between the rear surface of the ring and a generally rigid transparent rear cover, wherein a cavity is formed between the flexible membranes, the cavity being filled with a liquid, and wherein the amount of fluid in the cavity can be varied to vary the curvature of the flexible membranes and so vary the optical characteristics of the lens.

* * * * *